Patented May 23, 1950

2,509,010

UNITED STATES PATENT OFFICE 2,509,010

PROCESS FOR SOLVENT EXTRACTION OF PENICILLIN CULTURE LIQUORS

Graham W. McMillan, Terre Haute, Ind., assignor to Commercial Solvents Corporation, Terre Haute, Ind., a corporation of Maryland No Drawing. Application July 15, 1946, Serial No. 683,773

7 Claims. (Cl. 260—302)

This invention relates to the recovery of penicillin from aqueous penicillin-containing culture liquors, and more particularly to a process wherein such recovery is carried out by extraction of the liquors with water-immiscible organic solvents. My invention relates still more particularly to a method for preventing the formation of stable emulsions between the organic solvents and the penicillin-containing culture liquors in such extractions by a heat treatment of the culture liquors prior to the solvent-extraction process, as hereinafter described.

In the preparation of the antibiotic material penicillin by the propagation of molds such as *Penicillium notatum*, *Penicillium chrysogenum*, and the like, on nutrient media, the valuable penicillin material is formed in relatively very minute quantities in the culture liquor and must be removed and recovered by a series of relatively complicated extraction steps prior to its use in therapeutic applications.

One of the procedures proposed for recovering the active penicillin material from the aqueous culture liquors in which it is formed was to extract it by means of organic solvents, in which it was found to be soluble under acid conditions. All such liquid-liquid extractions, however, proved to be unsatisfactory, largely because of the tendency of the cultiure liquor to form emulsions with the organic solvent which could not be broken by ordinary means, such as by centrifugation, even though the culture liquor was first filtered or otherwise clarified to remove the mycelial growth and the major proportion of suspended solids.

I have now found that solvent extraction of filtered penicillin culture liquors may be readily carried out, without difficulty from emulsion formation, if the culture liquor, either before or after filtration, is heat-treated before extraction, as hereinafter described; and I have observed unexpectedly that such heat treatment, when carried out under the preferred conditions later to be described, produces no substantial loss of penicillin, contrary to what has been believed heretofore regarding the extreme heat-lability of penicillin.

In carrying out my invention, the penicillin-containing culture liquor or broth may first be treated according to known precedures, such as filtration or centrifugation, to remove the mycelial growth, if desired. The pH of the clarified liquor is then adjusted as will subsequently be specified herein, and the liquor is heated for a period and at a temperature sufficient to render it non-emulsifying in the subsequent extraction step, presumably by destroying or inactivating the so-called emulsifiers, that is, the emulsion-forming or emulsion-stabilizing constituents of the culture liquor, whatever they may be. A temperature of about 50 to 75° C. and a heating period of between about 10 minutes and four hours have been found satisfactory. After treatment, the treated liquor may be cooled to room temperature or somewhat below; or it may be further processed without being cooled. In either event, it should be filtered before the extraction step, if filtration has not already been carried out. The treated liquor is acidified to a pH preferably between about 2 and 4 to release the penicillin acid, and is then subjected to liquid-liquid extraction in suitable apparatus, such as a conventional column extraction unit or a Podbielniak centrifugal extractor.

In carrying out the heat-treatment of beer according to my invention, I prefer to operate within the pH range of about 5 to 8.5, owing to the instability of penicillin at elevated temperatures outside of the specified pH range. It is to be distinctily understood, nevertheless, that my process is operative to some degree over a somewhat wider pH range than the preferred range of 5 to 8.5.

For the successful operation of my process, it is necessary to heat the penicillin liquor to a temperature within the range of about 50 to 75° C. for a period of about 10 minutes upward in order for the desired reduction in the emulsion-forming characteristics of the culture liquor to take place. Somewhat higher temperatures may be used for shorter treatment times; but if such conditions are used, extreme care must be exercised not to prolong the treatment unduly, owing to the instability of penicillin at high temperatures. In general, I prefer to employ a temperature around 65° C. for a heating-period ranging from about 10 minutes to about four hours.

Solvents suitable for use in the extraction of clarified penicillin culture liquors treated in accordance with my invention may be any of the organic water-immiscible solvents for penicillin acid known or used in the extraction of penicillin from its aqueous solution. These include esters, such as amyl acetate, butyl acetate, and isopropyl acetate; chlorohydrocarbons, such as chloroform; and ketones, such as isobutyl methyl ketone.

The following specific examples will further illustrate my invention:

Example I

A 10,000-gallon batch of filtered penicillin-containing culture liquor produced by culture X-1612 assaying 194 Oxford units of penicillin per milliliter (total, 7.35 billion units) and having a pH of 7.6 was heated rapidly to 65° C. by passage through a series of pipes jacketed with steam under pressure, was then held at 65° C. for one hour in an insulated tank, and was subsequently bright-filtered and cooled rapidly to 25° C. by passage through a series of pipes jacketed with cold water. The beer was thereafter acidified to pH 2.0 with phosphoric acid, and subsequently fed to one inlet of a Podbielniak centrifugal extractor at a rate of 5 gallons per minute while butyl acetate was simultaneously fed to the other inlet at a rate of 1 gallon per minute. As soon as the first batch has been completed, a 9,600-gallon batch of similar filtered penicillin-containing culture liquor assaying 176 units per milliliter (total, 6.45 billion units) was heated at 65° C. for one hour and processed in the same way.

No trouble with emulsification of the culture liquor and solvent was encountered during the extractions.

The combined butyl acetate extracts measured 3900 gallons, and assayed 805 units per milliliter (total, 11.9 billion units), corresponding to an 86% recovery of the original penicillin present in the culture liquor.

Example II

Two batches of filtered penicillin-containing culture liquor produced by culture Q-176 were heated at 65° C. for one-half hour and were subsequently cooled, acidified, and extracted with butyl acetate as described in Example I. No emulsification difficulties were encountered. The penicillin-balance was as follows:

| Batch | 1 | 2 | Total |
|---|---|---|---|
| Culture Liquor: | | | |
| pH | 7.0 | 7.1 | |
| Volume, gal | 9,800 | 9,300 | |
| Assay, u./ml | 320 | 351 | |
| Total penicillin, 10⁹ units | 11.85 | 12.40 | 24.25 |
| Extract: | | | |
| Volume, gal | | | 3,950 |
| Assay, u./ml | | | 1,135 |
| Total penicillin, 10⁹ units | | | 17.0 |
| Recovery, per cent | | | 70 |

Example III

A series of laboratory experiments was carried out on clarified penicillin-containing culture liquor produced by culture X-1612 to compare the tendency of heated and unheated culture liquor to emulsify when extracted with amyl acetate. Small samples of the culture liquor, with and without heat treatment, were acidified to pH 2 and shaken vigorously for one minute with one-fifth of their volume of amyl acetate; and the time required for the layers to separate was then observed and recorded. A sample of unheated culture liquor was found to produce a stable emulsion, whereas four samples that had been heated for 15 minutes at 55, 60, 65, and 70° C. quickly separated into layers.

While the above describes the preferred embodiments of my invention, it will be understood that departures may be made therefrom within the scope of the specification and claims. In general it may be said that any modifications or equivalents that would ordinarily occur to those skilled in the art are to be considered as lying within the scope of my invention.

In accordance with the foregoing specification, I claim as my invention:

1. In the process of recovering penicillin from aqueous culture liquors containing the same wherein such a liquor is acidified to a pH within the range of about 2 to 4 followed by extraction with organic water-immiscible solvents in which penicillin in its acid form is soluble and which tend to form emulsions with the acidified culture liquors during the extraction step, the method for preventing the formation of emulsions between the said culture liquors and the said solvents which comprises heating said penicillin-containing culture liquors at a temperature between about 50 and about 75° C. for a period sufficient to inactivate emulsifiers present in the liquors prior to the acidification and prior to the solvent-extraction process.

2. In the process of recovering penicillin from aqueous culture liquors containing the same wherein such a liquor is acidified to a pH within the range of about 2 to 4 followed by extraction with organic water-immiscible solvents in which penicillin in its acid form is soluble and which tend to form emulsions with the acidified culture liquors during the extraction step, the method for preventing the formation of emulsions between the said acidified culture liquors and the said solvents which comprises heating said penicillin containing culture liquors at a temperature between about 50 and about 75° C. for a period between about 10 minutes and about 4 hours prior to the acidification and prior to the solvent-extraction process.

3. In the process of recovering penicillin from aqueous culture liquors containing the same wherein such a liquor is acidified to a pH within the range of about 2 to 4 followed by extraction with organic water-immiscible solvents in which penicillin in its acid form is soluble and which tend to form emulsions with the acidified culture liquors during the extraction step, the method for preventing the formation of emulsions between the said acidified culture liquors and the said solvents which comprises adjusting the pH of the culture liquors to between about 5 and about 8.5 and heating said culture liquors at a temperature between about 50 and about 75° C. for a period from about one-half hour to 4 hours prior to carrying out the solvent-extraction process.

4. The process of claim 3 in which the organic water-immiscible solvent is butyl acetate.

5. The process of claim 3 in which the organic water-immiscible solvent is isobutyl methyl ketone.

6. The process of claim 3 in which the organic water-immiscible solvent is chloroform.

7. In the extraction of penicillin from culture liquors containing the same without the formation of emulsions during the extraction step, the process which comprises adjusting the pH of such a culture liquor to within the range of about 5 to 8.5, heating said culture liquor for a period of between about 10 minutes and four hours sufficient to inactivate emulsifiers present, acidifying the culture liquor to bring it within the pH range of from about 2 to 4, and then extracting penicillin from the acidified liquor with an organic water-immiscible solvent for penicillin in its acid form which solvent tends to form emulsions with acidified culture liquors which have not been heated as described; said culture liquor being filtered prior to said extraction step.

GRAHAM W. McMILLAN.

REFERENCES CITED

The following references are of record in the file of this patent:

UNITED STATES PATENTS

| Number | Name | Date |
| --- | --- | --- |
| 1,391,219 | Takamine | Sept. 20, 1921 |

OTHER REFERENCES

Reid Jr., Bacteriology, vol. 29, pp. 215-221 (1935).

Foster et al., "J. Bacteriology," vol. 46 (1943), page 385.

Transaction American Inst. Chemical Eng., vol. 40 (1944), pp. 747-758.

Waksman, Microbial Antagonism and Antibiotic Substances (1945), pp. 176-177, Commonwealth Fund.